United States Patent
Zhou

(10) Patent No.: US 10,204,087 B2
(45) Date of Patent: Feb. 12, 2019

(54) MEDIA INTERACTION METHOD AND APPARATUS

(71) Applicant: TENCENT TECHNOLOGY (SHENZHEN) COMPANY LIMITED, Shenzhen, Guangdong (CN)

(72) Inventor: Bin Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 257 days.

(21) Appl. No.: 15/172,517

(22) Filed: Jun. 3, 2016

(65) Prior Publication Data

US 2016/0283450 A1 Sep. 29, 2016

Related U.S. Application Data

(63) Continuation of application No. PCT/CN2015/072284, filed on Feb. 5, 2015.

(30) Foreign Application Priority Data

Dec. 5, 2013 (CN) .......................... 2013 1 0651650

(51) Int. Cl.
*G06F 17/00* (2006.01)
*G06F 17/22* (2006.01)
(Continued)

(52) U.S. Cl.
CPC .... *G06F 17/2247* (2013.01); *G06F 17/30899* (2013.01); *G06T 3/4038* (2013.01);
(Continued)

(58) Field of Classification Search
None
See application file for complete search history.

(56) References Cited

U.S. PATENT DOCUMENTS 6,931,534 B1 8/2005 Jandel et al.
6,996,623 B1 2/2006 Kawano et al.
(Continued)

FOREIGN PATENT DOCUMENTS

CN 1288304 A 3/2001
CN 1333973 A 1/2002
(Continued)

OTHER PUBLICATIONS

Office Action Issued in Chinese Application No. 201310651650.8 dated Nov. 16, 2017, 8 pages.
(Continued)

*Primary Examiner* — Howard Cortes
(74) *Attorney, Agent, or Firm* — Knobbe Martens Olson & Bear LLP

(57) ABSTRACT

A media interaction method, apparatus, and system is provided. A terminal device sends a triggering request for representing media information, and receives a history statistic number M of previous triggering requests for representing the media information, where M is a positive integer or zero; determines whether M is smaller than a preset positive integer N which is not smaller than 1; and blurs the media information and represents blurred media information if M is smaller than the preset positive integer N; and represents all media information if M is larger than or equal to the preset positive integer N.

11 Claims, 4 Drawing Sheets

(51) Int. Cl.
*G06F 17/30* (2006.01)
*G06T 3/40* (2006.01)
*G06T 5/00* (2006.01)
*H04L 29/08* (2006.01)
*H04N 1/44* (2006.01)
*H04L 12/58* (2006.01)

(52) U.S. Cl.
CPC .............. *G06T 5/002* (2013.01); *H04L 67/22* (2013.01); *H04N 1/4493* (2013.01); *G06T 2200/32* (2013.01); *H04L 51/10* (2013.01)

(56) References Cited

U.S. PATENT DOCUMENTS

| | | | |
|---|---|---|---|
| 2007/0150340 A1* | 6/2007 | Cartmell | G06Q 10/10 705/14.55 |
| 2009/0138906 A1* | 5/2009 | Eide | G06F 17/30038 725/32 |
| 2010/0293059 A1* | 11/2010 | Davison | G06Q 30/02 705/14.69 |
| 2011/0251885 A1* | 10/2011 | Abigail | G06Q 30/02 705/14.31 |
| 2011/0264751 A1* | 10/2011 | Jans | G06Q 10/107 709/206 |
| 2014/0344951 A1* | 11/2014 | Brewer | G06F 3/0488 726/28 |
| 2014/0344954 A1* | 11/2014 | Kim | G06F 3/0485 726/28 |
| 2015/0324614 A1* | 11/2015 | Dey | G06K 9/6254 345/641 |

FOREIGN PATENT DOCUMENTS

| | | |
|---|---|---|
| CN | 102205796 A | 10/2011 |
| CN | 102567906 A | 7/2012 |
| CN | 102592141 A | 7/2012 |
| CN | 102916929 A | 2/2013 |
| CN | 103024163 A | 4/2013 |
| CN | 103208077 A | 7/2013 |
| WO | WO-2014083378 A1 * | 6/2014 ........... G06K 9/6254 |

OTHER PUBLICATIONS

International Search Report for International Application No. PCT/CN2015/072284 dated Apr. 1, 2015 in 4 pages.

International Preliminary Report on Patentability for International Application No. PCT/CN2015/072284 dated Jun. 7, 2016, in 9 pages.

Office Action with Concise Explanation of Relevance for Chinese Application No. CN 201310651650.8 dated Jun. 25, 2018.

* cited by examiner

MEDIA INTERACTION METHOD AND APPARATUS

CROSS REFERENCE TO RELATED APPLICATIONS

This application is a continuation application of PCT Patent Application No. PCT/CN2015/072284, filed on Feb. 5, 2015, which claims priority to Chinese Patent Application No. 201310651650.8, filed on Dec. 5, 2013, both of which are incorporated by reference in their entirety.

BACKGROUND

Field

The present disclosure relates to information processing, especially to a media interaction method and apparatus.

Description of the Related Art

In traditional internet media delivery schemes, various kinds of media (e.g., portal websites, video websites, or email servers), serving as media delivers, insert a segment of script of a media system into a webpage, an email, or a video player; a media owner delivers media through a media management system; and when a user browses a webpage or a video, the webpage or a video player will automatically pull matched media, and then script will represent media contents in specified format, and report media exposure rates to the media owner.

SUMMARY

A media interaction method and a media interaction apparatus are provided according to embodiments of the present disclosure to improve interaction efficiency.

According to embodiments of the present disclosure, a media interaction method is provided. The method includes: sending a triggering request for representing media information, and receiving a history statistic number M of previous triggering requests for representing the media information, where M is a positive integer or zero; determining whether M is smaller than a preset positive integer N which is not smaller than 1; and blurring the media information and representing blurred media information in response to determining that M is smaller than the preset positive integer N; and representing all media information in response to determining that M is larger than or equal to the preset positive integer N.

According to embodiments of the present disclosure, a media interaction apparatus is provided. The apparatus includes: a processor and a memory; in which the memory stores computer readable instructions and the processor executes the computer readable instructions to: send a triggering request for representing media information, and receive a history statistic number M of previous triggering requests for representing the media information, where M is a positive integer or zero; determine whether M is smaller than a preset positive integer N which is not smaller than 1; and blur the media information and representing blurred media information in response to determining that M is smaller than the preset positive integer N; and represent all media information in response to determining that M is larger than or equal to the preset positive integer N.

According to embodiments of the present disclosure, a media interaction method implemented on a server is provided. The method includes: receiving a triggering request for representing media information, and counting a history statistic number M of triggering requests, where M is at least a positive integer or zero; determining whether M is smaller than a preset positive integer N which is not smaller than 1; and blurring the media information so that a user terminal represents blurred media information in response to determining that M is smaller than the preset positive integer N; and representing all media information by the user terminal in response to determining that M is larger than or equal to the preset positive integer N.

As seen that in the embodiments of the present disclosure, media information is not represented unidirectionally, but users can interact with media information so that interaction efficiency between media and the user is improved.

BRIEF DESCRIPTION OF THE DRAWINGS

To make the technical schemes of the embodiments of the present disclosure readily understood, a brief introduction of the accompanying drawings that are needed to describe the embodiments will be provided in the following.

DETAILED DESCRIPTION OF THE PREFERRED EMBODIMENT

To make the objects, technical means and advantages of the present disclosure more readily understood, the embodiments of the present disclosure will be further described hereinafter in conjunction with the accompanying drawings.

Figure 1:
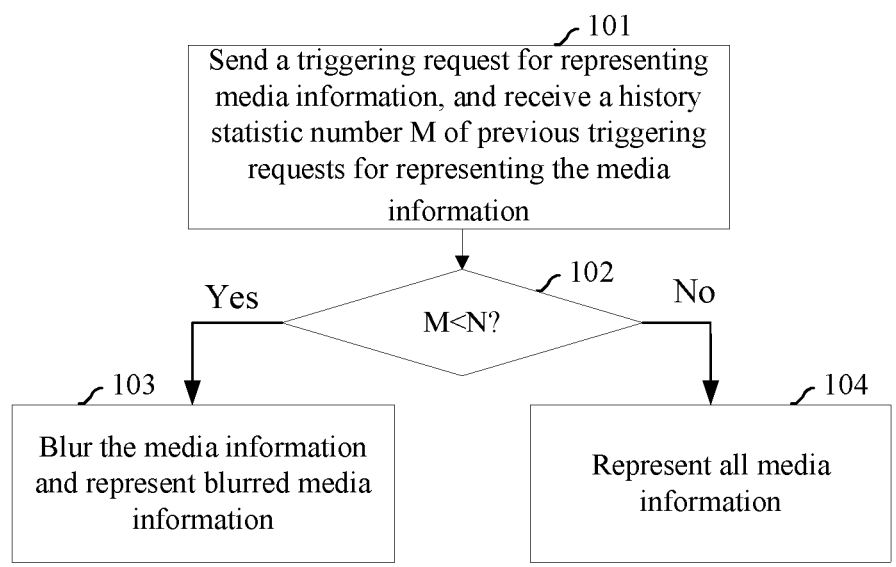
FIG. 1 is a flowchart of a media interaction method according to an embodiment of the present disclosure.

FIG. 1 is a flowchart of a media interaction method according to an embodiment of the present disclosure.

As shown in FIG. 1, the method includes the following steps.

At step 101, a triggering request for representing media information is sent, and a history statistic number N of previous triggering requests for representing media information is received, where M is a positive integer or zero.

Herein, media promotion information may be sent to respective terminals by a server at a network side, and the respective terminals trigger media promotion information to send triggering requests for representing media information to the server. After the server receives the triggering requests for representing media information from the respective terminals, it counts the history statistic number M of the triggering requests, where M is a positive integer or zero. When the server receives a triggering request from a certain terminal, it will add 1 to the history statistic number M. The server also sends the history statistic number M counted by the time when the server sends the history statistic number M to the respective terminals according to an order of time when the server receives the triggering requests.

For example, assume there are 3 terminals, terminal A, terminal B and terminal C. The terminal A sends a triggering request to the server at a first ($1^{st}$) second, and the terminal B sends a triggering request to the server at a second ($2^{nd}$) second, and the terminal C sends a triggering request to the server at a third second. At the first second, the server receives the triggering request sent from the terminal A. Assuming that the server has received 4 triggering requests previously, then the server sends a history statistic number M to the terminal A, where M is 4, and then the server adds 1 to M, i.e., M being updated to 5. At the second, the server receives the triggering request sent from the terminal B, and at this time, M is 5, then the server returns the history statistic number M to the terminal B, where M is 5, and then the server adds 1 to M, i.e., M being updated to 6. Then at the third second, the server receives the triggering request sent from the terminal C, and at this time, M is 6, then the server returns the history statistic number M to the terminal C, where M is 6, and then the server adds 1 to M, i.e., M being updated to 7.

For example, an email server at a network side may send an email to respective email receiving terminals, and the email contains a link to media promotion information. After the respective email terminals trigger the link, the email server receives triggering requests for representing media information, and counts the triggering requests, e.g., counting the number of the triggering requests.

At step 102, it is determined whether M is smaller than a preset positive integer N, where N is at least 1. If M is smaller than N, then the method proceeds to step 103; or otherwise, if M is larger than or equal to N, the method proceeds to step 104.

At step 103: received media information is blurred, and blurred media information is represented.

At step 104: all media information is represented.

Blurring media information for example includes: generating an overlay on media information, and generating mosaic on the overlay.

The server at the network side sends media information to the respective terminals, and the respective terminals receive media information.

For example, media information may be at least one of: image information contained in an email; video information contained in an email; audio information contained in an email; image information contained in a weibo message; video information contained in a weibo message; or audio information contained in a weibo message.

The server at the network side may further send a history statistic number M of triggering requests to the respective terminals. The history statistic number M is updated dynamically, so that the respective terminals can know the latest value of M in time.

For example, media information is divided into N pieces of sub-media information in which M pieces of sub-media information are displayed on a displayer of a user terminal, and rest N-M pieces of sub-media information are displayed on the displayer after being blurred, where N is a positive integer not smaller than 1. The M pieces of sub-media information and the N-M pieces of sub-media information are selected randomly, or in other ways. For example, in a situation where media information is an image, N pieces of media information may be displayed in sequence according to their locations in the image. For audio information and video information, it may be divided into N segments, and M out of N segments may be represented. Audio information and video information may be divided according to its length or content.

N is a preset positive integer not smaller than 1. Values of M received by the respective terminals may be different because times when the values of M are counted are different.

For example, assume that N is 3000, and M received by a terminal is 1200. Then, on this terminal, media information is divided into 3000 pieces of sub-media information in which 1200 pieces of sub-media information are represented and rest N-M (i.e., 1800) pieces of sub-media information are blurred, and the blurred N-M pieces of sub-media information are represented. For example, media information may be image information. That is, on the terminal, the image is divided into 3000 pieces of sub-images, and 1200 pieces out of them are clearly displayed while rest 1800 pieces are blurred (e.g., covered with mosaic).

In an embodiment, once it is determined that M is smaller than N, all media information will be blurred.

In an embodiment, when N-M is equal to zero, media information will not be divided and blurred, but all media information will be represented.

When N-M is smaller than zero, media information will not be divided and blurred, but all media information will be represented.

In an embodiment, it is further determined whether the triggering request is valid. If it is determined that the triggering request is valid, the triggering request is set as a valid triggering request, and counted into the history statistic number M of triggering requests; if it is determined that the triggering request is invalid, the triggering request is set as an invalid triggering request, and will not be counted into the history statistic number M of triggering requests.

In an embodiment, determining whether the triggering request is valid may include at least one of the following: determining whether the triggering request is valid according to an IP address of a sending source of the triggering request; determining whether the triggering request is valid according to an account of the sending source of the triggering request, etc. For example, triggering requests sent from a same IP address can only be counted once and/or triggering requests sent from a same account are counted only once.

In an embodiment, the method further includes the following process. When N-M is not zero, an information carrier that carries media information is sent to a certain third party which is on a third party receiving list preset by the server; and the third party in the third party receiving list sends a triggering request for representing media information. In this way, a user may be encouraged to forward the information carrier carrying media information (e.g., an email) to more receiving users, so that N-M can reach zero or be smaller than zero faster, to represent all media information.

Media information for example is image information; and sub-media information is sub-image information; and blurring the N-M pieces of sub-media information includes: generating an overlay on the N-M pieces of sub-image information, and generating mosaic on the overlay.

In an embodiment, the terminal may include but is not limited to: a feature phone, a smart phone, a palm computer, a personal computer (PC), a tablet computer, a personal digital assistant, etc.

Though detailed examples of the terminal are provided, a person skilled in the art can be aware that what is listed are only for illustration purpose, and should not be construed as limitations to the protection scope of the present disclosure. The terminal may be applicable to any smart terminal operating system, and an operating system that can be used includes but is not limited to: Android, Palm OS, Symbian, Windows mobile, Linux, iphone OS, Black Berry OS 6.0, Windows Phone, etc.

Specifically, the terminal may adopt an Android operating system, and the terminal may use various versions of Android operating systems including but not limited to: Astro Boy (Android Beta), Clockwork Robot (Android 1.0), Cupcake (Android 1.5), Donut (Android 1.6), Eclair (Android 2.0/2.1), Froyo (Android 2.2), Gingerbread (Android 2.3), Honeycomb (Android 3.0), Ice Cream Sandwich (Android 4.0), Jelly Bean (Android 4.1), etc.

Though specific versions of the Android platform have been listed in the foregoing, the embodiments of the present disclosure are not limited to the listed versions, and they may be applicable to other versions based on the Android software architecture.

In the following, the present disclosure will be described using an example in which media information is image information and the media information carrier is an email.

For example, when the embodiments of the present disclosure are used for email-related media promotion, a media information banner serving as the promotion content may be inserted into an email, and the email is sent to respective email receiving terminals. The email may be: if you want to see an overall promotion content of the promotion product, the email should be opened by N (where N is a preset positive integer) users. That is, the method is to encourage an email receiving terminal to send the email to others. Each time when a new person opens the email, media information of the email will be more fully represented, and finally, if more than N people have read the email, media information will be unveiled.

During implementation, the email may contain a script page, and the script page displays an image based on the number of times that users open the script page (repeated open will not be counted).

First, a media information source uploads materials of a banner image to a media delivery system; and sets email addresses of target people; then the media delivery system generates a hypertext marked language (html) page (including a script page) based on the uploaded banner image; and the html page has the following functions: (1) dividing the banner image into N pieces (e.g., N is 3000); (2) blurring the banner image; and (3) counting the number of times of opening and displaying the banner image.

Figure 2:
FIG. 2 is a schematic diagram of blurring media information according to an embodiment of the present disclosure.
Figure 3:
FIG. 3 is a schematic diagram of representing media information according to an embodiment of the present disclosure.

FIG. 2 is a schematic diagram of blurring media information according to an embodiment of the present disclosure. FIG. 3 is a schematic diagram of representing media information according to an embodiment of the present disclosure.

Then, according to orientation requirements of the media information source, the media delivery system saves a html file in an email and sends it to target people. When a target person opens the email and views the banner image, the html file will add 1, and notify the target person of the number of people that have opened the email, to encourage the target user to open the email; a user is counted based on an email account and an independent IP, if both of which of the user are unique, then the user is identified as a valid user, and is counted.

When finally, N (i.e., 3000) persons have opened the email and viewed the banner image, the html file will automatically represent media information, and unveil the blurred part to display an overall image.

In the foregoing, the embodiments of the present disclosure are described using image information as media information, and using the email as the media information carrier as an example. The description is only for illustration purpose, and should not be construed as limitations to the embodiments of the present disclosure. For example, media information may also be video information, the media information carrier is the email, and the blurring operation may be covering mosaic on the video. Media information may be audio information, and the media information carrier is the email; in this case, the blurring operation may be adding noises in an audio, etc.

Based on the foregoing description, a media interaction apparatus is further provided according to embodiments of the present disclosure.

Figure 4:
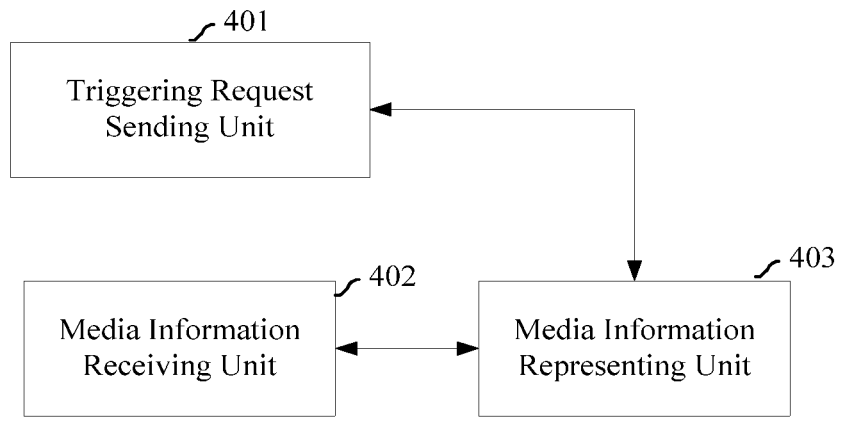
FIG. 4 is schematic diagram of a media interaction apparatus according to an embodiment of the present disclosure.

FIG. 4 is a schematic diagram of a structure of a media interaction apparatus according to embodiments of the present disclosure.

As shown in FIG. 4, the apparatus includes a triggering request sending unit 401, a media information receiving unit 402, and a media information representing unit 403.

The triggering request sending unit 401 sends a triggering request for representing media information, and receives a history statistic number M of previous triggering requests for representing media information, where M is a positive integer or zero.

The media information receiving unit 402 receives media information.

The media information representing unit 403 blurs received media information and represents blurred media information when M is smaller than a preset positive integer N; and represents all media information when M is larger than or equal to the preset positive integer N, where N is a positive integer not smaller than 1.

For example, media information is divided into N pieces of sub-media information in which M pieces of sub-media information are represented, and rest N-M pieces of sub-media information are blurred, where N is a positive integer not smaller than 1. The M pieces of sub-media information and the N-M pieces of sub-media information are selected randomly, or in other ways. For example, in a situation where media information is an image, N pieces of media information may be shown in sequence according to their locations in the image.

In an embodiment, media information may be at least one of: image information contained in an email; video information contained in an email; audio information contained in an email; image information contained in a weibo message; video information contained in a weibo message; or audio information contained in a weibo message.

In an embodiment, the apparatus further includes a triggering request counting unit (not shown). The triggering request counting unit receives the triggering request for representing media information, and determines whether the triggering request is valid. When determining that the triggering request is valid, the triggering request counting unit sets the triggering request as a valid triggering request, and counts the triggering request into the history statistic number M of the triggering requests; and when determining that the triggering request is invalid, the triggering request counting unit sets the triggering request as an invalid triggering request, and does not count the triggering request into the history statistic number M of the triggering requests.

In an embodiment, determining whether the triggering request is valid includes at least one of the following: determining whether the triggering request is valid according to an IP address of a triggering request sending source; and determining whether the triggering request is valid according to an account of the triggering request sending source.

In an embodiment, the apparatus further includes a forwarding unit (not shown). The forwarding unit sends an information carrier carrying media information to a third party in a preset third party receiving list when N-M is not equal to zero; and the third party in the third party receiving list sends the triggering request for representing media information.

In an embodiment, media information is image information; sub-media information is sub-image information; and the media information representing unit 403 generates an overlay on N-M pieces of sub-image information; and generate mosaic on the overlay.

Based on the foregoing analysis, a media interaction system is further provided according to the embodiments of the present disclosure.

Figure 5:
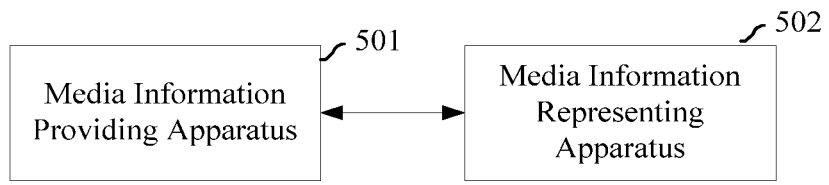
FIG. 5 is a schematic diagram of a media interaction system according to an embodiment of the present disclosure.

FIG. 5 is a schematic diagram of a media interaction system according to embodiments of the present disclosure.

As shown in FIG. 5, the media interaction system includes a media information representing apparatus 501 and a media information providing apparatus 502.

The media information providing apparatus 501 receives a triggering request for representing media information, counts a history statistic number M of the triggering requests, where M is a positive integer or zero, and sends media information.

The media information representing apparatus 502 divides media information into N pieces of sub-media information, represents M pieces of sub-media information out of the N pieces of sub-media information, blurs rest N-M pieces of sub-media information, and represents N-M pieces of sub-media information blurred, where N is a preset positive integer not smaller than 1.

In an embodiment, the media information providing apparatus 501 further determines whether the triggering request is valid after receiving the triggering request for representing media information, and if the media information providing apparatus 501 determines that the triggering request is valid, the media information providing apparatus 501 sets the triggering request as a valid triggering request, and count it into the history statistic number M of triggering requests; and if the media information providing apparatus 501 determines that the triggering request is invalid, the media information providing apparatus 501 sets the triggering request as an invalid triggering request and does not count it into the history statistic number M of the triggering requests.

In an embodiment, when N-M is not equal to zero, the media information representing apparatus 502 sends an information carrier carrying media information to a certain third party in the third party receiving list preset by a server; and the third party in the third party receiving list sends the triggering request for representing media information.

Various types of media information can be displayed according to the embodiments of the present disclosure, and they are internet advertisements.

In fact, the media interaction method and apparatus according to the embodiments of the present disclosure may be implemented in various ways.

For example, the media interaction method may be programmed as a plug-in program installed on a personal computer or a mobile terminal in comply with a certain application interface rule, or it may be encapsulated as an application for a user to download and use. When the media interaction method is programmed as a plug-in program, it may be implemented as ocx, dll, cab, etc. plug-ins. Or the media interaction method of the embodiments of the present disclosure may be implemented as a Flash plug-in, a RealPlayer plug-in, a multimedia messaging service (MMS) plug-in, a MIDI musical notation plug-in, an Active X plug-in, etc. using specific technologies.

The media interaction method provided according to the embodiments of the present disclosure may be stored as instructions or an instruction set on various kinds of storage media. The storage media include but are not limited to: a floppy disk, an optical disk, a DVD, a hard disk, a flash, a universal serial bus disk, a compact flash (CF) card, a secure digital (SD) card, a multimedia (MMC) card, a SM card, a memory stick, an xD card, etc.

In addition, the media interaction method provided according to embodiments of the present disclosure may be applied to a Nand flash-based storage medium, e.g., a universal serial bus disk, a CF card, a SD card, a secure digital high capacity (SDHC) card, a MMC card, a SM card, a memory stick, an xD card, etc.

Figure 6:
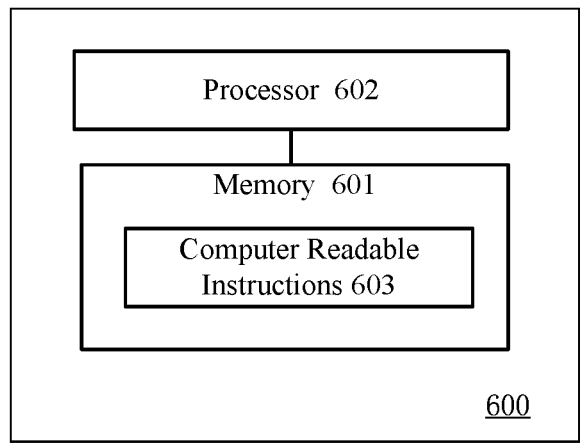
FIG. 6 is a schematic diagram of a media interaction system according to an embodiment of the present disclosure.

FIG. 6 is a schematic diagram of a media interaction apparatus according to an embodiment of the present disclosure. As shown in FIG. 6, the media interaction apparatus 600 includes a memory 601 and a processor 602. The memory 601 stores computer readable instructions 603 that when executed by the processor 602, execute the following steps: sending a triggering request for representing media information, and receiving a history statistic number M of previous triggering requests for representing media information, where M is a positive integer or zero; determining whether M is smaller than a preset positive integer N which is at least 1; and blurring received media information and representing blurred media information if M is smaller than the preset positive integer N; and representing all media information if M is larger than or equal to the preset positive integer N.

For example, blurring media information may include: generating an overlay on media information; and generating mosaic on the overlay.

For example, blurring media information may include: dividing media information into N pieces of sub-media information, and blurring N-M pieces of sub-media information out of the N pieces of sub-media information.

Media information for example is image information, and blurring media information includes: dividing media information into N pieces of sub-media information, and generating an overlay on N-M pieces of sub-media information out of the N pieces of sub-media information; and generating mosaic on the overlay.

Media information may be at least one of: image information contained in an email; video information contained in an email; audio information contained in an email; image information contained in a weibo message; video information contained in a weibo message; or audio information contained in a weibo message.

The processor further executes the computer readable instructions to: send a media carrier which carries media information to a third party in a third party receiving list preset by the server, if N-M is not zero; and the third party in the third party receiving list sends a triggering request for representing media information.

The present disclosure further provides a non-transitory computer-readable storage medium storing the computer-readable instructions 603.

Figure 7:
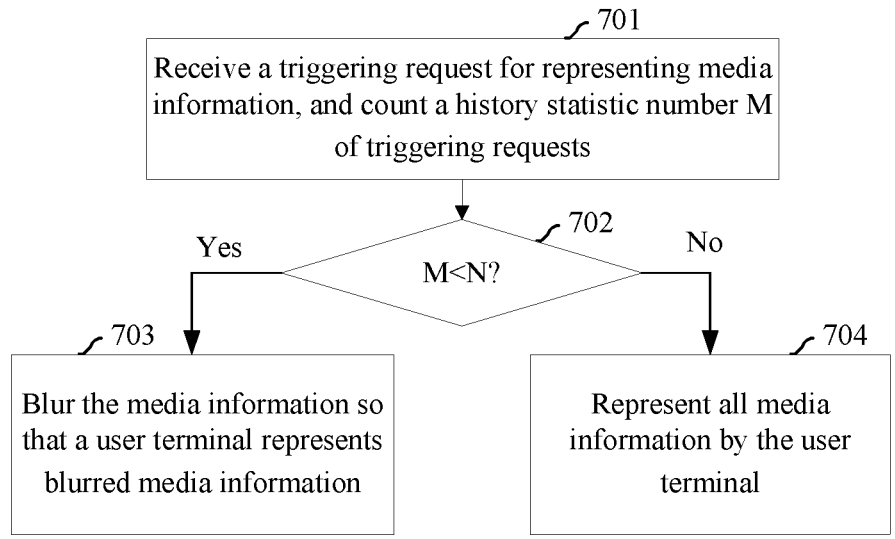
FIG. 7 is a schematic diagram of a media interaction method according to an embodiment of the present disclosure.

FIG. 7 is a flowchart of a media interaction method according to embodiments of the present disclosure. The method is used at a server.

As shown in FIG. 7, the method may include the following steps.

At step 701, a triggering request for representing media information is received, and a history statistic number M of triggering requests is counted, where M is at least a positive integer or zero; and it is determined whether M is smaller than a preset positive integer N which is at least 1; and if M is smaller than N, step 703 is entered, or otherwise, if M is larger than or equal to N, step 704 is entered.

At step 703, media information is blurred so that the user terminal represents blurred media information.

At step 704 the user terminal represents all media information.

Blurring media information may include: generating an overlay on media information, and generating mosaic on the overly.

Blurring media information for example may include: dividing media information into N pieces of sub-media information, and blurring N-M pieces of sub-media information out of the N pieces of sub-media information.

Blurring media information for example may include: dividing media information into N pieces of sub-media information, generating an overlay on N-M pieces of sub-media information out of the N pieces of sub-media information; and generating mosaic on the overlay.

Media information may be at least one of: image information contained in an email; video information contained in an email; audio information contained in an email; image information contained in a weibo message; video information contained in a weibo message; or audio information contained in a weibo message.

The method may further include: determining whether the triggering request is valid, and if it is determined that the triggering request is valid, setting the triggering request as a valid triggering request, and counting the triggering request into a history statistic number M; and if it is determined that the triggering request is invalid, setting the triggering request as an invalid triggering request, and not counting the triggering request into the history statistic number M.

Determining whether the triggering request is valid may through the following methods: determining whether the triggering request is valid according to an IP address of the user terminal that sends the triggering request; and determining whether the triggering request is valid according to a user account that sends the triggering request.

Figure 8:
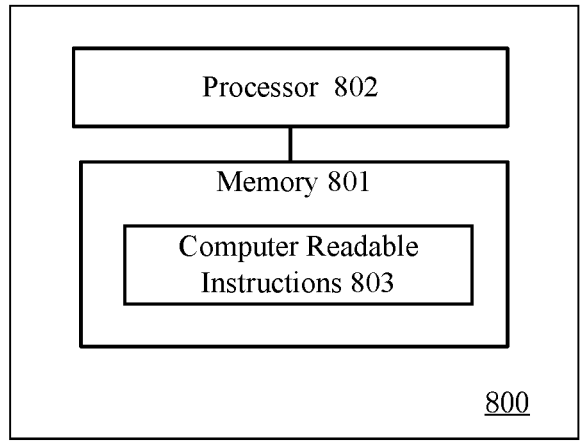
FIG. 8 is a schematic diagram of a media interaction apparatus according to an embodiment of the present disclosure.

FIG. 8 is a media interaction apparatus 800 according to embodiments of the present disclosure. The media interaction apparatus 800 includes a memory 801 and a processor 802, in which the memory 801 stores computer readable instructions 803, and the processor 802 executes the computer readable instructions 803 to: receiving a triggering request for representing media information, and counting a history number M of triggering requests, where M is at least a positive integer or zero; determining whether M is smaller than a preset positive integer N not smaller than 1; blurring media information and representing blurred media information by the user terminal, if M is smaller than the preset positive integer N; and representing all media information by the user terminal, if M is larger than or equal to the preset positive integer N, where N is a positive integer not smaller than 1.

Blurring media information for example may include: generating an overlay on media information; and generating mosaic on the overlay.

For example, blurring media information may include: dividing media information into N pieces of sub-media information, and blurring N-M pieces of sub-media information out of the N pieces of sub-media information.

Media information for example is image information, and blurring media information includes: dividing media information into N pieces of sub-media information, and generating an overlay on N-M pieces of sub-media information out of the N pieces of sub-media information; and generating mosaic on the overlay.

Media information may be at least one of: image information contained in an email; video information contained in an email; audio information contained in an email; image information contained in a weibo message; video information contained in a weibo message; or audio information contained in a weibo message.

The processor 802 executes the computer readable instructions 803 to: determine whether the triggering request is valid, and if it is determined that the triggering request is valid, set the triggering request as a valid triggering request, and count the triggering request to a history statistic number M of triggering requests; and if it is determined that the triggering request is invalid, set the triggering request as an invalid triggering request and not to count the triggering request to the history statistic number M.

Determining whether the triggering request is valid may be through at least one of the following methods: determining whether the triggering request is valid according to an IP address of the user terminal which sends the triggering request; or determining whether the triggering request is valid according to a user account which sends the triggering request.

The present disclosure further provides a non-transitory computer-readable storage medium, storing the computer readable instructions 803.

Thus, in the embodiments of the present disclosure, a triggering request for representing media information is sent, and a history statistic number M of triggering requests is received, where M is a positive integer or zero; media information is received; media information is divided into N pieces of sub-media information in which M pieces of sub-media information are represented, and rest N-M pieces of sub-media information are blurred, where N is a preset positive integer not smaller than 1. The M pieces of sub-media information and the N-M pieces of sub-media information are selected randomly, or in other ways. For example, if media information is an image, the N pieces of sub-media information may be represented in sequence according to their locations in the image. As seen that in the embodiments of the present disclosure, media information is not represented unidirectionally, but users can interact with media information so that interaction efficiency between media and the user is improved.

In addition, a form of media interaction for social communications is provided according to the embodiments of the present disclosure so that media can be really paid attention to and clicked; in this way, the number of clicks and conversions rates can be improved.

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

What is claimed is:

1. A media interaction method, implemented on a terminal device, the method comprising:
   receiving a media carrier that carries a trigger of media information from a server through a network;
   sending a triggering request for representing the media information to the server in response to determining that the trigger is triggered, and receiving a history statistic number M of previous triggering requests for representing the media information from the server, where M is a positive integer or zero;
   determining whether M is smaller than a preset positive integer N which is not smaller than 1; and
   blurring the media information and representing blurred media information on the media carrier in response to determining that M is smaller than the preset positive integer N;
   wherein the media information is video information or audio information, and wherein blurring the media information and representing blurred media information comprises:
      dividing the media information into N segments of media information according to a length of the media information or content of the media information,
      blurring N-M segments of media information out of the N segments of media information, and representing the blurred N-M segments of media information and M segments of media information which are not blurred on the media carrier,
      wherein for the media information being audio information, blurring the N-M segments of media information comprises adding noise in the N-M segments.

2. The media interaction method according to claim 1, wherein the media information comprises at least one of the following:
   video information contained in an email; audio information contained in an email; video information contained in a microblog message; or audio information contained in a microblog message.

3. The media interaction method according to claim 1, wherein the method further comprises:
   sending the media carrier that carries the media information to a third party in a third party receiving list preset by the server; and
   sending, by the third party in the third party receiving list, the triggering request for representing the media information.

4. A media interaction apparatus, comprising a processor and a memory; wherein the memory stores computer readable instructions and the processor executes the computer readable instructions to:
   receive a media carrier that carries a trigger of media information from a server through a network;
   send a triggering request for representing the media information in response to determining that the trigger is triggered, and receiving a history statistic number M of previous triggering requests for representing the media information, where M is a positive integer or zero;
   determine whether M is smaller than a preset positive integer N which is not smaller than 1; and
   blur the media information and representing blurred media information on the media carrier in response to determining that M is smaller than the preset positive integer N;
   wherein the media information is video information or audio information, and wherein blurring the media information and representing blurred media information comprises:
      dividing the media information into N segments of media information according to a length of the media information or content of the media information, blurring N-M segments of media information out of the N segments of media information, and representing the blurred N-M segments of media information and M segments of media information which are not blurred on the media carrier,
      wherein for the media information being audio information, blurring the N-M segments of media information comprises adding noise in the N-M segments.

5. The media interaction apparatus of claim 4, wherein the media information comprises at least one of the following:
   video information contained in an email; audio information contained in an email; video information contained in a microblog message; or audio information contained in a microblog message.

6. The media interaction apparatus of claim 4, wherein the processor executes the computer readable instructions to:
   send the media carrier that carries the media information to a third party in a third party receiving list preset by the server in response to determining that N-M is not equal to zero; and
   send, by the third party in the third party receiving list, the triggering request for representing the media information.

7. A media interaction method, implemented on a server, the method comprising:
   sending a media carrier that carries a trigger of media information to a terminal device through a network;
   receiving a triggering request for representing the media information from the terminal device, and counting a history statistic number M of triggering requests sent from terminal devices, where M is at least a positive integer or zero;
   determining whether M is smaller than a preset positive integer N which is not smaller than 1; and
   blurring the media information so that the terminal device represents blurred media information on the media carrier in response to determining that M is smaller than the preset positive integer N;
   wherein the media information is video information or audio information, and wherein blurring the media information and representing blurred media information comprises:
      dividing the media information into N segments of media information according to a length of the media information or content of the media information, blurring N-M segments of media information out of the N segments of media information, and representing the blurred N-M segments of media information and M segments of media information which are not blurred on the media carrier,
      wherein for the media information being audio information, blurring the N-M segments of media information comprises adding noise in the N-M segments.

8. The media interaction method of claim 7, wherein the media information comprises at least one of the following:

video information contained in an email; audio information contained in an email; video information contained in a microblog message; or audio information contained in a microblog message.

9. The media interaction method of claim 7, wherein the method further comprises:
  determining whether the triggering request is valid, and setting the triggering request as a valid triggering request and counting the triggering request into the history statistic number M of triggering requests in response to determining that the triggering request is valid; and setting the triggering request as an invalid triggering request and not counting the triggering request into the history statistic number M of triggering requests in response to determining that the triggering request is an invalid triggering request.

10. The media interaction method of claim 9, wherein determining whether the triggering request is valid comprises at least one of the following:
  determining whether the triggering request is valid according to an IP address of the terminal device which sends the triggering request; or
  determining whether the triggering request is valid according to a user account which sends the triggering request.

11. The media interaction method of claim 7, wherein the media carrier is an email and the method further comprises:
  receiving materials of the media information;
  generating the email by using the materials of the media information to generate a hypertext marked language page contained in the email, wherein the email has at least one preset recipient, and the hypertext marked language page has script to divide the media information into N pieces, blur the media information in response to determining that M is smaller than the preset positive integer N, and count the number of times of accessing the media information.

* * * * *